(12) United States Patent
Wada

(10) Patent No.: US 7,315,498 B2
(45) Date of Patent: Jan. 1, 2008

(54) DVD REPRODUCING APPARATUS, DISK REPRODUCING APPARATUS AND DVD REPRODUCING METHOD

(75) Inventor: Kozo Wada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 596 days.

(21) Appl. No.: 10/926,054

(22) Filed: Aug. 26, 2004

(65) Prior Publication Data

US 2005/0047289 A1    Mar. 3, 2005

(30) Foreign Application Priority Data

Aug. 28, 2003 (JP) ............... P.2003-209181

(51) Int. Cl.
    *G11B 7/00*      (2006.01)
(52) U.S. Cl. ............... 369/47.27; 369/275.3
(58) Field of Classification Search ............ 369/275.3, 369/47.27, 44.26, 53.41, 53.29, 53.24
See application file for complete search history.

(56) References Cited

U.S. PATENT DOCUMENTS 7,102,978 B2 * 9/2006 Ogihara ............... 369/59.17

FOREIGN PATENT DOCUMENTS

| | | |
|---|---|---|
| JP | 61-206976 | 9/1986 |
| JP | 04-178199 | 6/1992 |
| JP | 10-228713 | 8/1998 |
| JP | 11-73648 A | 3/1999 |
| JP | 2001-209949 | 8/2001 |
| JP | 2001-256656 | 9/2001 |
| JP | 2001-297443 A | 10/2001 |
| JP | 2002-352448 | 12/2002 |
| JP | 1002-067937 | 3/2003 |

* cited by examiner

*Primary Examiner*—Nabil Hindi
(74) *Attorney, Agent, or Firm*—Morgan, Lewis & Bockius LLP

(57) ABSTRACT

A DVD reproducing apparatus includes a pickup to read data from a disk having a pit data area to form pits along tracks and an NBCA to read data by laser cutting in a radial direction, a tracking error signal generator to generate a tracking error signal, an RF signal generator to process a signal output from the pickup to generate an RF signal, an NBCA data demodulator to employ the RF signal to demodulate data recorded in the NBCA, a jump controller to permit the pickup to jump over the tracks based on the tracking error signal, and a sled motor to move the pickup in the radial direction. Preferably, the jump controller applies a predetermined voltage to the sled motor, sets a time length to apply the predetermined voltage, and moves the pickup from the NBCA to the pit data area by single driving of the sled motor.

18 Claims, 8 Drawing Sheets

FIG. 10

| NUMBER OF JUMPS (N) | CALCULATION METHOD |
|---|---|
| 1 – 6 | $48+7\times(N-1)$ |
| 7 – 11 | $76+12\times(N-5)$ |
| 12 – 21 | $136+30\times(N-10)$ |

DVD REPRODUCING APPARATUS, DISK REPRODUCING APPARATUS AND DVD REPRODUCING METHOD

BACKGROUND OF THE INVENTION

1. Field of the Invention

The present invention relates to a DVD reproducing apparatus and a disk reproducing apparatus for reading data from a disk on which are a pit data area, in which pits indicating data are formed along tracks, and a cutting data area, in which data are recorded by laser cutting in an irradiation direction.

2. Description of the Related Art

In accordance with CPRM (Content Protection for Recordable Media), which conforms to the Video Recording Format, reproduction of the first copy of data contents recorded on a DVD-RW is permitted, however, reproduction of following copies of data may not be permitted. Further, the number of times for data have been copied is indicated by using data that are recorded in an NBCA (Narrow Burst Cutting Area) using laser cutting (hereinafter referred to as cutting data). Therefore, before reproducing a DVD-RW including the contents for which reproduction is permitted only for the first copy, a disk reproducing apparatus reads the cutting data from the DVD-RW to determine whether the data contents are the first copy. When the data contents are the first copy, the disk reproducing apparatus reproduces the contents. But when the data contents are not the first copy, the disk reproducing apparatus does not reproduce the data (first conventional example).

Another technique has been proposed (second conventional example). According to this technique, a motor equipped with a tachometer is employed as a motor for moving a pickup in the radial direction, and the pickup is positioned in accordance with a rotation instruction for the tachometer provided for the motor, or an instruction for the amplitude of a current supplied to the motor. As a result, the pickup is moved in the radial direction to the center position of the recording range for BCA data and reads the BCA data. Then, the pickup is moved in the radial direction a distance equivalent to 100 tracks to a position toward the center and reads BCA data. Thereafter, the pickup reads BCA data at a position reached by moving toward the outer circumference a distance equivalent to 200 tracks, at a position reached by moving toward the center a distance equivalent to 300 tracks, at a position reached by moving toward the outer circumference a distance equivalent to 400 tracks, and at a position reached by moving toward the center a distance equivalent to 500 tracks (see, for example, JP-A-2001-297443 (paragraphs [0022] to [0025])).

In addition, another technique has been proposed (third conventional example). According to this technique, for the reproduction of BCA data, a servo circuit is controlled to read data in a lead-in area using a CLV method. When the rotation of the disk becomes stable (when the rotation speed of a disk motor becomes appropriate for the reading of BCA data), the servo control for the rotation of the disk motor is halted, and a pickup is moved to the recording area for the BCA data. Thereafter, the detection of the BCA data is begun (see, for example, JP-A-11-73648 (paragraphs [0041] to [0043])).

SUMMARY OF THE INVENTION

When the first conventional example is applied for a disk reproducing apparatus for employing a phase difference detection method to generate a tracking error signal, the following problem has arisen. The problem will now be described while referring to FIG. 3. When a light-receiving device 1 divided into four regions is employed, according to the phase difference detection method, a phase difference detector 41 is employed to detect a phase difference between the output for a region A and the output for a region B, and a phase difference detector 42 is employed to detect a phase difference between the output for a region D and the output for a region C. An adder 43 is then employed to add the output of the phase difference detector 41 to the output of the phase difference detector 42, and the obtained result is used as a tracking error signal TE. That is, using the phase difference detection method, the tracking error signal TE is generated based on a difference in timings where pits appear in the four regions A to D. Therefore, for a track wherein a pit is not formed, the tracking error TE can not be generated using the phase difference detection method.

An NBCA (denoted by 513 in FIG. 5) is provided inside a lead-in area 512. When a finalization process has not yet been performed, the large portion of the lead-in area 512 is a non-data recording area, i.e., an area wherein pits indicating data are not formed along tracks. Therefore, for a disk reproducing apparatus that employs a phase difference detection method to generate a tracking error signal, when the pickup jumps tracks and moves to the lead-in area 512 in order to read data recorded in the NBCA of a DVD-RW that has not yet been finalized, the number of tracks skipped can not be obtained. Therefore, it is difficult to move a pickup to the NBCA 513 located inside the lead-in area 512, and data recorded in the NBCA 513 can not be read.

This problem can be resolved by using a stepping motor as a sled motor for moving a pickup in the radial direction. Specifically, since a stepping motor can control the number of revolutions, and accordingly, can control the distance traveled by the pickup in the radial direction, the pickup can jump tracks to the NBCA 513, and can read data recorded therein. Further, when a direct current motor is employed and when an FG signal generator is provided at the rotary shaft to exercise closed loop control, the pickup can also jump tracks to the NBCA 513, and can read data recorded therein. However, a stepping motor is expensive, and a driving circuit is extremely complicated, or when an FG signal generator is provided for the rotary shaft of a direct current motor to exercise closed loop control, the sled motor becomes complicated. Therefore, the use of a stepping motor or a direct current motor is difficult for a home DVD reproducing apparatus for which price is a major component. Thus, there has been a demand for a configuration wherein a direct current motor that is not subject to the closed loop control is employed to enable the reading of data recorded in the NBCA 513.

Since, according to the second conventional example, the tachometer is provided for the sled motor, it is difficult for that second conventional example to be employed to resolve the problem for the first conventional example.

The third conventional example discloses that, for the reproduction of BCA data, the servo circuit is controlled to reproduce data in the lead-in area using the CLV method, and thereafter, the servo control for the rotation of the disk motor is turned off, or the pickup is moved to the BCA data recording area. However, when a motor that is not subject to closed loop control is employed as a sled motor, a method is not disclosed for moving the pickup to the BCA data recording area. Therefore, it is difficult for the third conventional example to be employed to resolve the problem for the first conventional example.

The present invention is proposed to resolve the conventional shortcomings. It is one objective of the present invention to provide a DVD reproducing apparatus, wherein a direct current motor that is not subject to closed loop control is employed as a sled motor, wherein, when a tracking error signal is generated by a phase difference detection method, NBCA data can be read from a DVD-RW that has not been finalized, wherein, when because of a variance in the friction of a mechanism for employing a sled motor to move a pickup, the distance traveled by the pickup differs even when a constant voltage is applied to the sled motor at a constant application time, it is possible to prevent both the occurrence of a phenomenon such that a pickup skips an NBCA and the extension of a period before the pickup is moved to the NBCA, wherein the moving of the pickup in an area where pits are not formed can be stabilized, and wherein it is possible to simplify the calculation of the voltage application time, during which a voltage is applied to the sled motor to return the pickup, located in the NBCA, to the range in the vicinity of the inner circumference of an area wherein pits are formed.

It is another objective of the present invention to provide a disk reproducing apparatus that employs, as a sled motor, a direct current motor that is not subject to closed loop control and that can read NBCA data from a non-finalized DVD-RW even when a tracking error signal is generated by a phase difference detection method.

It is an additional objective of the present invention to provide a disk reproducing apparatus wherein, when because of a variance in movement smoothness for a mechanism that employs a sled motor to move a pickup, the distance traveled by the pickup differs even when a constant voltage is applied to the sled motor at a constant application time, it is possible to prevent both the occurrence of a phenomenon such that the pickup skips the NBCA and the extension of a period before the pickup is moved to the NBCA.

It is a further objective of the present invention to provide a disk reproducing apparatus that can stabilize the control for the movement of a pickup in an area wherein pits are not formed.

It is one more objective of the present invention to provide a disk reproducing apparatus that can return a pickup located in an NBCA to an area where pits are formed.

It is yet another objective of the present invention to provide a disk reproducing apparatus that can return a pickup located in an NBCA to a range in the vicinity of the inner circumference of an area wherein pits are formed.

It is still another objective of the present invention to provide a disk reproducing apparatus that can simplify the calculation of a voltage application time for applying a voltage to a sled motor in order to return a pickup located in an NBCA to a range in the vicinity of the inner circumference of an area wherein pits are formed.

To achieve these objectives, according to one aspect of the present invention, a DVD reproducing apparatus includes a pickup to read data from a disk which includes a pit data area to form pits depicting data along tracks and an NBCA to read data by laser cutting in a radial direction, an RF signal processor which includes a tracking error signal generator to generate a tracking error signal using a phase difference detection method and an RF signal generator to perform a predetermined process for a signal output from the pickup to generate an RF signal, an NBCA data demodulator to employ the RF signal to demodulate data recorded in the NBCA, a jump controller to permit the pickup to jump over the tracks based on the tracking error signal, and a sled motor to move the pickup in the radial direction. Preferably, a direct current motor a revolution of which is not subject to closed loop control is employed as a sled motor. Preferably, to read data recorded in an NBCA of a disk having a non-pit area which does not form pits and is located between a pit data area and the NBCA, the jump controller moves the pickup to an initial position which is in the pit data area and is in a vicinity of a border between the non-pit area and the pit data area, and repeats a control for driving the sled motor to move the pickup toward the NBCA using a predetermined drive method until the NBCA data demodulator demodulates NBCA data. Preferably, to drive the sled motor to move the pickup from the initial position toward the NBCA, the jump controller fixes a gain and an offset employed by the RF signal generator to generate the RF signal, sets a rotational speed for the disk to a value corresponding to reading data in the NBCA, and turns off a tracking servo. Preferably, to repeat the control for driving the sled motor to move the pickup toward the NBCA, the jump controller increases a product of a voltage to be applied to the sled motor and a time length to apply the voltage, in accordance with an increase in a number of times the sled motor is driven. Preferably, to move the pickup located in the NBCA to the pit data area, the jump controller applies a predetermined voltage to the sled motor, sets a time length to apply the predetermined voltage to a value corresponding to a number of times that the sled motor is driven to move the pickup from the initial position to the NBCA, and moves the pickup from the NBCA to the pit data area by single driving of the sled motor.

Specifically, when the method for driving the sled motor is a method for moving the pickup in the radial direction a tiny distance, such as one of several fractions of the size of a non-pit area in the radial direction, each time the sled motor is driven, the pickup is moved a tiny distance from the initial position to the cutting data area. Therefore, when the sled motor is repetitively driven, the pickup passes across the non-pit area and moves to the cutting data area. Then, when the pickup is moved to the cutting data area, the cutting data demodulator demodulates data, so that the jumping controller can ascertain that the pickup has moved to the cutting data area and can halt the sled motor. Further, when the voltage to be applied to the sled motor and the application time are constant, and when the mechanism for permitting the sled motor to shift the pickup is smoothly moved, the pickup is moved to the cutting data area by driving the sled motor a small number of times. When, however, the movement of the mechanism is not smooth, the sled motor must be driven an extremely large number of times. However, the product of the voltage to be applied to the sled motor and the voltage application time need only be increased in accordance with the number of times the sled motor will be driven. Then, when the movement of the mechanism is not smooth, the pickup can be moved to the cutting data area by driving the sled motor a comparatively small number of times. Further, when the product of the voltage and the application time is increased while the movement of the mechanism is smooth, the pickup would pass across the cutting data area instead of being halted there. However, since the product of the voltage of the application time is small when the sled motor is driven a small number of times, the pickup can be prevented from passing across the cutting data area instead of being halted. Furthermore, when the pickup is located in the non-pit area, the output of the pickup is not a signal significant for the control, so that it is possible to prevent unstable control of the tracking servo, the gain and the offset and the rotational speed of the disk, and to prevent the occurrence of an unexpected problem. The number of times the sled motor is driven to move the pickup from the initial position to the cutting data area is a value indicating how smooth was the movement of the mechanism that moves the pickup in the radial direction. Therefore, when the product of the voltage to be applied to the sled motor and the application time is set as a value corresponding to the number of times that the sled motor is driven to move the pickup from the initial position to the cutting data area, the amount that the sled motor is driven is a value corresponding to the smoothness of the movement of the mechanism. Therefore, the pickup can be returned to a position close to the initial position, and the amount that the sled motor is driven can be easily calculated.

According to another aspect of the present invention, a disk reproducing apparatus includes a pickup to read data from a disk which includes a pit data area to form pits depicting data are formed along tracks and a cutting data area to record data by laser cutting in a radial direction, an RF signal processor which includes a tracking error signal generator to generate a tracking error signal using a phase difference detection method and an RF signal generator to perform a predetermined process for a signal output from the pickup to generate an RF signal, a cutting data demodulator to employ the RF signal to demodulate data recorded in the cutting data area, a jump controller to permit the pickup to jump over the tracks based on the tracking error signal, and a sled motor to move the pickup in the radial direction. Preferably, a direct current motor, a revolution of which is not subject to closed loop control, is employed as a sled motor. Preferably, to read data recorded in a cutting data area of a disk having a non-pit area which does not form pits and is located between a pit data area and the cutting data area, the jump controller moves the pickup to an initial position which is in the pit data area and is in the vicinity of a border between the non-pit area and the pit data area and repeats a control for driving the sled motor to move the pickup toward the cutting data area using a predetermined drive method until the cutting data demodulator demodulates cutting data.

Specifically, when the method for driving the sled motor is a method for moving the pickup in the radial direction a tiny distance, such as one of several fractions of the size of a non-pit area in the radial direction, each time the sled motor is driven, the pickup is moved a tiny distance from the initial position to the cutting data area. Therefore, when the sled motor is repetitively driven, the pickup passes across the non-pit area and moves to the cutting data area. Then, when the pickup is moved to the cutting data area, the cutting data demodulator demodulates data, so that the jumping controller can ascertain that the pickup has moved to the cutting data area and can halt the sled motor.

In addition to this arrangement, to repeat the process for permitting the sled motor to move the pickup toward the cutting data area, the jump controller increases, in accordance with an increase in the number of times the sled motor is driven, a product of a voltage to be applied to the sled motor and an application time for the voltage. Specifically, when the voltage to be applied to the sled motor and the application time are constant, and when the mechanism for permitting the sled motor to shift the pickup is smoothly moved, the pickup is moved to the cutting data area by driving the sled motor a small number of times. When, however, the movement of the mechanism is not smooth, the sled motor must be driven an extremely large number of times. However, the product of the voltage to be applied to the sled motor and the voltage application time need only be increased in accordance with the number of times the sled motor will be driven. Then, when the movement of the mechanism is not smooth, the pickup can be moved to the cutting data area by driving the sled motor a comparatively small number of times. Further, when the product of the voltage and the application time is increased while the movement of the mechanism is smooth, the pickup would pass across the cutting data area instead of being halted there. However, since the product of the voltage of the application time is small when the sled motor is driven a small number of times, the pickup can be prevented from passing across the cutting data area instead of being halted.

In addition to the arrangement described above, to permit the sled motor to move the pickup from the initial position toward the cutting data area, the jump controller fixes a gain and an offset employed by the RF signal generator to generate the RF signal, designates a rotational speed for the disk for reading data in the cutting data area, and turns off a tracking servo. That is, when the pickup is located in the non-pit area, the output of the pickup is not a signal significant for the control, so that it is possible to prevent unstable control of the tracking servo, the gain and the offset and the rotational speed of the disk, and to prevent the occurrence of an unexpected problem.

Furthermore, to move the pickup located in the cutting data area to the pit data area, the jump controller drives the sled motor only once to move the pickup from the cutting data area to the pit data area. That is, after predetermined data have been read from the cutting data area, the pickup is returned to the pit data area from which an address designating a position can be read.

Further, to move the pickup located in the cutting data area to the pit data area, the jump controller designates as a product of a voltage to be applied to the sled motor and an application time a value that corresponds to the number of times that the sled motor is driven to move the pickup from the initial position to the cutting data area, so that by driving the sled motor only once, the pickup is moved from the cutting data area to the pit data area. Specifically, the number of times the sled motor was driven to move the pickup from the initial position to the cutting data area is a value indicating how smooth was the movement of the mechanism that moves the pickup in the radial direction. Therefore, when the product of the voltage to be applied to the sled motor and the application time is set as a value corresponding to the number of times that the sled motor was driven to move the pickup from the initial position to the cutting data area, the amount that the sled motor was driven is a value corresponding to the smoothness of the movement of the mechanism. Therefore, the pickup can be returned to a position close to the initial position.

In addition to the above described configuration, to move the pickup located in the cutting data area to the pit data area, the jump controller applies a predetermined voltage to the sled motor and designates as an application time foe the predetermined voltage a value that corresponds to the number of times that the sled motor was driven to move the pickup from the initial position to the cutting data area, so that by driving the sled motor only once, the pickup is moved from the cutting data area to the pit data area. Specifically, the number of times the sled motor was driven to move the pickup from the initial position to the cutting data area is a value indicating how smooth was the movement of the mechanism that moves the pickup in the radial direction. Therefore, when the product of the voltage to be applied to the sled motor and the application time is set as a value corresponding to the number of times that the sled motor was driven to move the pickup from the initial position to the cutting data area, the amount that the sled motor is driven is a value corresponding to the smoothness of the movement of the mechanism. Therefore, the pickup can be returned to a position close to the initial position, and the amount that the sled motor was driven can be easily calculated.

According to yet another aspect of the invention, a DVD reproducing method includes reading data using a pickup from a disk which includes a pit data area to form pits depicting data along tracks and an NBCA to read data by laser cutting in a radial direction, generating a tracking error signal using a phase difference detection method, performing a predetermined process for a signal output from the pickup to generate an RF signal, employing the RF signal to demodulate data recorded in the NBCA, permitting the pickup to jump over the tracks based on the tracking error signal, employing a direct current motor a revolution of which is not subject to closed loop control as a sled motor to move the pickup in the radial direction, to read data recorded in an NBCA of a disk having a non-pit area which does not form pits and is located between a pit data area and the NBCA moving the pickup to an initial position which is in the pit data area and is in a vicinity of a border between the non-pit area and the pit data area and repeating a control for driving the sled motor to move the pickup toward the NBCA using a predetermined drive method until the NBCA data demodulator demodulates NBCA data, to drive the sled motor to move the pickup from the initial position toward the NBCA fixing a gain and an offset employed by the RF signal generator to generate the RF signal setting a rotational speed for the disk to a value corresponding to reading data in the NBCA and turning off a tracking servo, to repeat the control for driving the sled motor to move the pickup toward the NBCA increasing a product of a voltage to be applied to the sled motor and a time length to apply the voltage in accordance with an increase in a number of times the sled motor is driven, and to move the pickup located in the NBCA to the pit data area applying a predetermined voltage to the sled motor setting a time length to apply the predetermined voltage to a value corresponding to a number of times that the sled motor is driven to move the pickup from the initial position to the NBCA and moving the pickup from the NBCA to the pit data area by single driving of the sled motor.

BRIEF DESCRIPTION OF THE DRAWINGS

Preferred embodiments of the present invention will be described in detail based on the following figures, wherein:

FIG. 10 is a diagram for explaining a method for calculating the time for the driving of a sled motor.

DETAILED DESCRIPTION IF THE INVENTION

The preferred embodiment of the present invention will now be described while referring to drawings.

Figure 5:
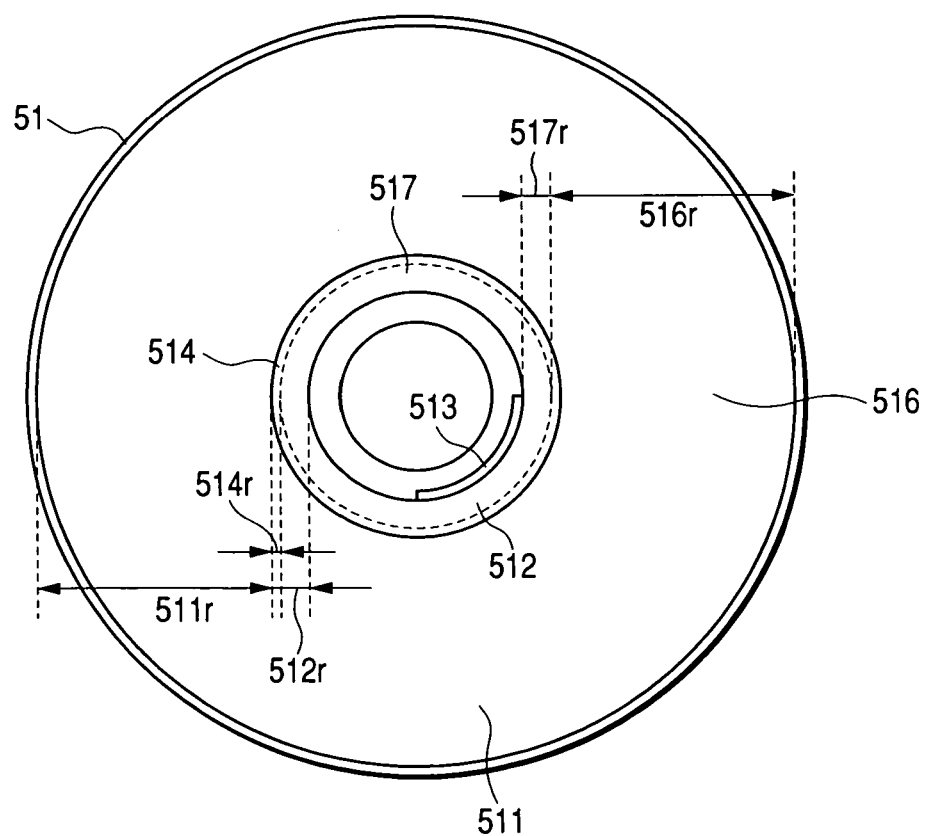
FIG. 5 is a diagram for explaining recording areas on a disk (DVD-RW)
Figure 6:
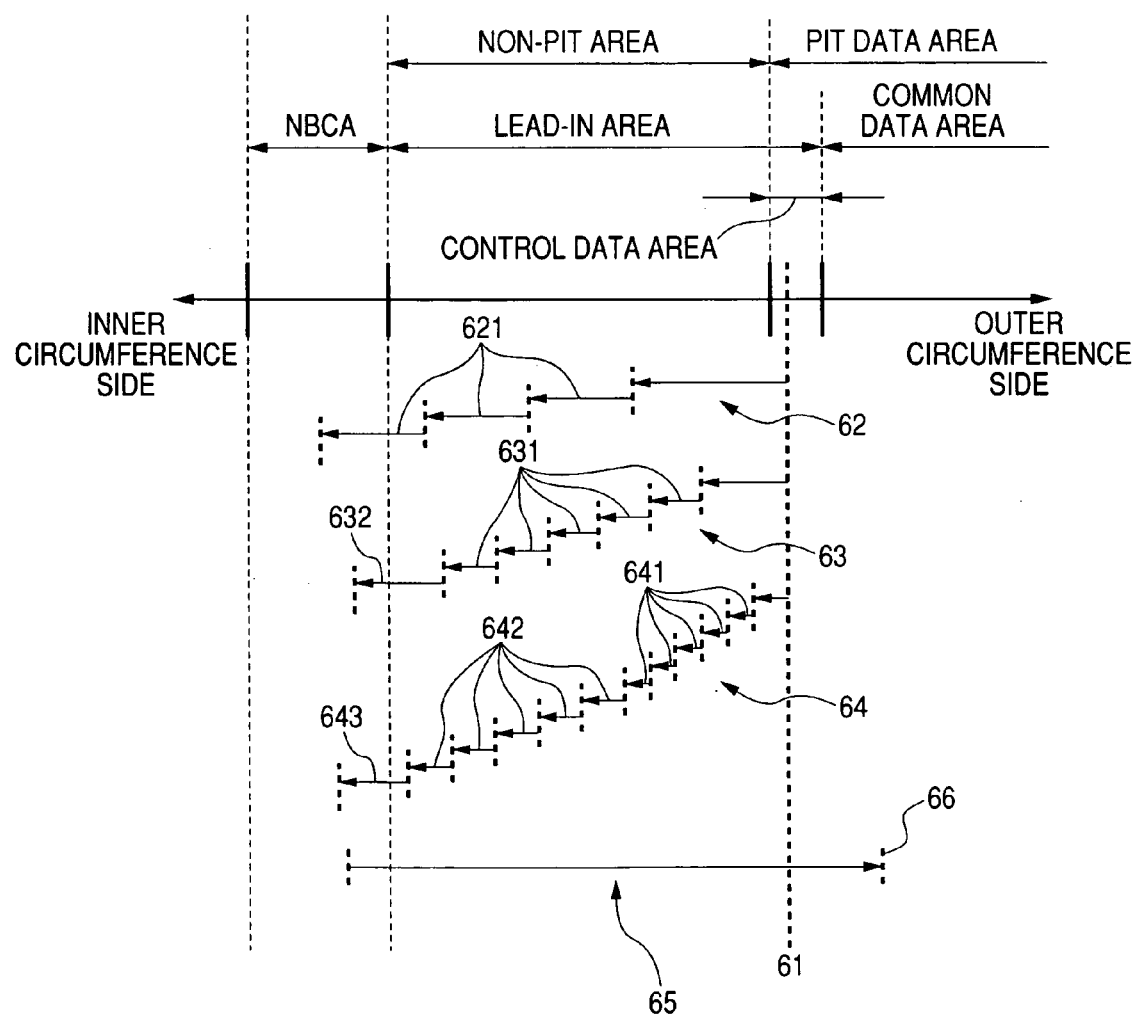
FIG. 6 is a diagram for explaining how a pickup is moved.

FIGS. 5 and 6 are diagrams for explaining the recording area for a disk (DVD-RW) from which data are reproduced by a DVD reproducing apparatus, which is a disk reproducing apparatus according to the embodiment of the present invention.

In FIGS. 5 and 6, a lead-in area 512 (having a radial range 512r) is provided along the inner circumference of a common data area 511 (having a radial range 511r), which is equivalent to a data recording area for an ordinary DVD. An NBCA 513 (cutting data area in claims) is provided within a range of about 90 degrees along the inner circumference of the lead-in area 512. In the lead-in area 512, a control data area 514 (having a radial range 514r) is provided in contact with the common data area 511, and data representing a disk type and data indicating the presence/absence of the NBCA are stored in the control data area 514.

In the lead-in area 512, an area 517 (having a radial range 517r) is provided along the inner circumference of the control data area 514, and data are not recorded in this area when a DVD has not been finalized. That is, when the DVD has not been finalized, the area 517 is a non-pit area wherein pits are not formed along tracks, although the tracks are formed therein. Since the common data area 511 and the control data area 514 are areas wherein pits are formed along the tracks, an area (having a radial range 516r) along the outer circumference of the control data area 514 is called a pit data area 516.

Figure 1:
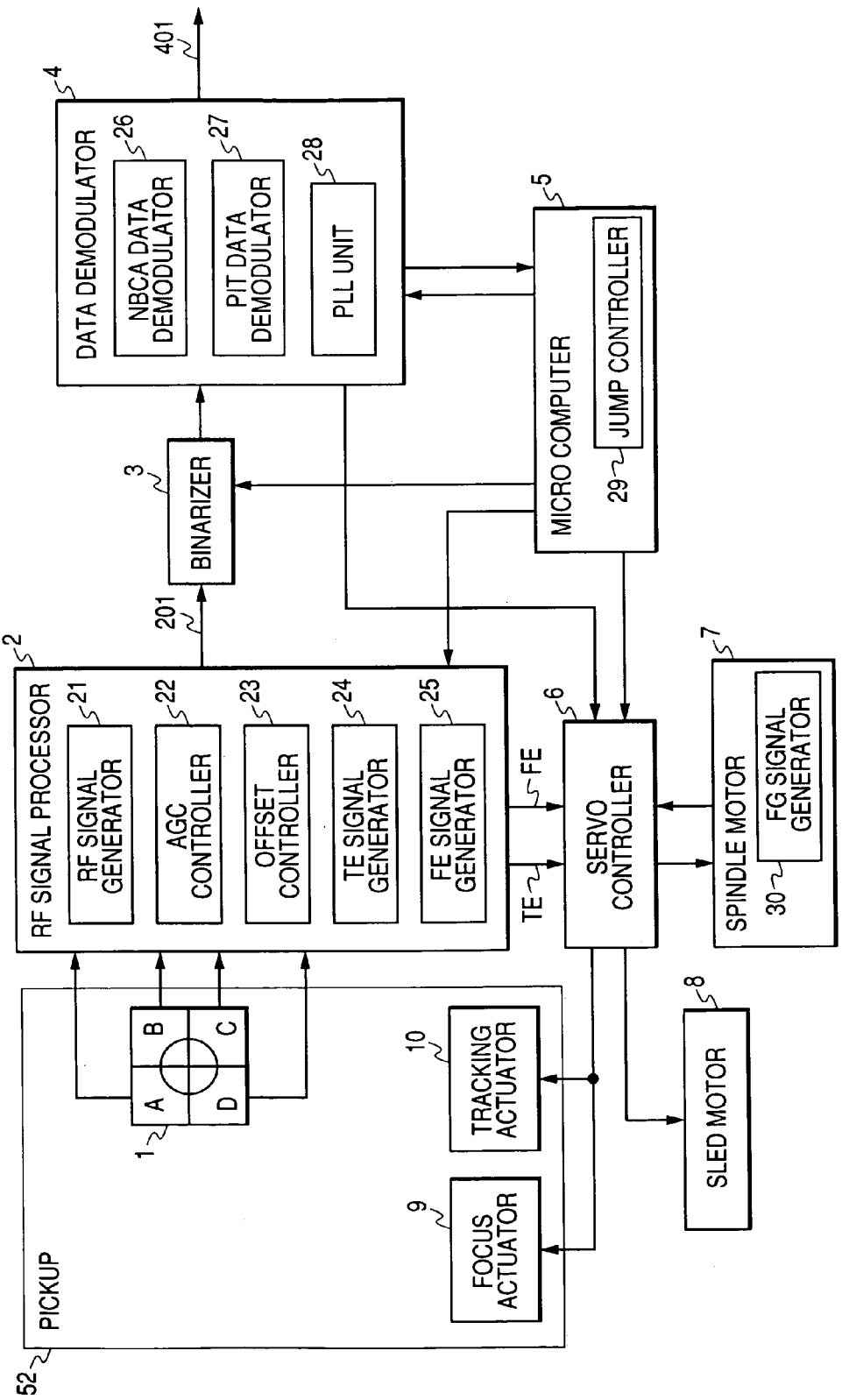
FIG. 1 is a block diagram showing the electric configuration of a disk reproducing apparatus according to one embodiment of the present invention.
Figure 2:
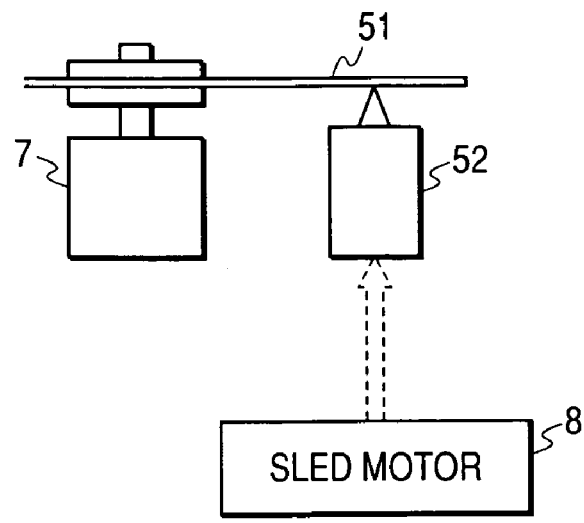
FIG. 2 is a diagram for explaining a mechanism related to a pickup.

FIG. 1 is a block diagram showing the electrical configuration of the DVD reproducing apparatus according to this embodiment, and blocks for demodulating digital data are specifically shown for the DVD reproducing apparatus. FIG. 2 is a diagram for explaining a mechanism related to a pickup.

In FIGS. 1 and 2, a spindle motor 7, for rotating a disk (DVD-RW or a DVD-R) 51, internally includes an FG signal generator 30 representing a rotational speed. An FG signal generated by the FG signal generator 30 is transmitted to a servo controller 6. A pickup 52 reads data represented by pits formed along tracks and data recorded in the NBCA 513 by laser cutting in the irradiation direction. For this process, the DVD reproducing apparatus comprises a light-receiving device 1 constituted by four regions A to D, a focus actuator 9 and a tracking actuator 10. A sled motor 8 is a direct current motor for moving the pickup 52 in the radial direction, and the rotational speed and the number of revolutions are not subject to closed loop control.

Based on outputs from the four regions A to D of the light-receiving device 1, an RF signal processor 2 generates an RF signal 201, a focus error signal FE and a tracking error signal TE. For this process, the RF signal processor 2 includes an RF signal generator 21, an AGC controller 22, an offset controller 23, a TE signal generator 24 and an FE signal generator 25.

Figure 4:
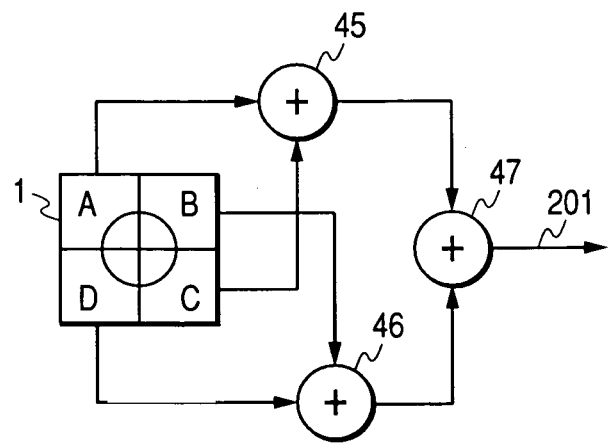
FIG. 4 is a block diagram showing the electric configuration of an RF signal generator.

Based on the output of the light-receiving device 1, the RF signal generator 21 generates the RF signal 201 and outputs it to a data demodulator 4. During this process, as shown in a schematic diagram in FIG. 4, an adder 45 adds the output of the region A to the output of the region C, and an adder 46 adds the output of the region D to the output of the region B. An adder 47 adds the output of the adder 45 to the output of the adder 46, and outputs the sum as the RF signal 201 to a binarizer 3. The AGC controller 22 controls the amplification rate of an amplifier (not shown) in the RF signal generator 21, so that the amplitude of the RF signal 201 output by the RF signal generator 21 is a predetermined value. The offset controller 23 controls the offset level of the amplifier (not shown) in the RF signal generator 2, so that the offset level of the RF signal 201 output by the RF signal generator 21 is a predetermined level.

Figure 3:
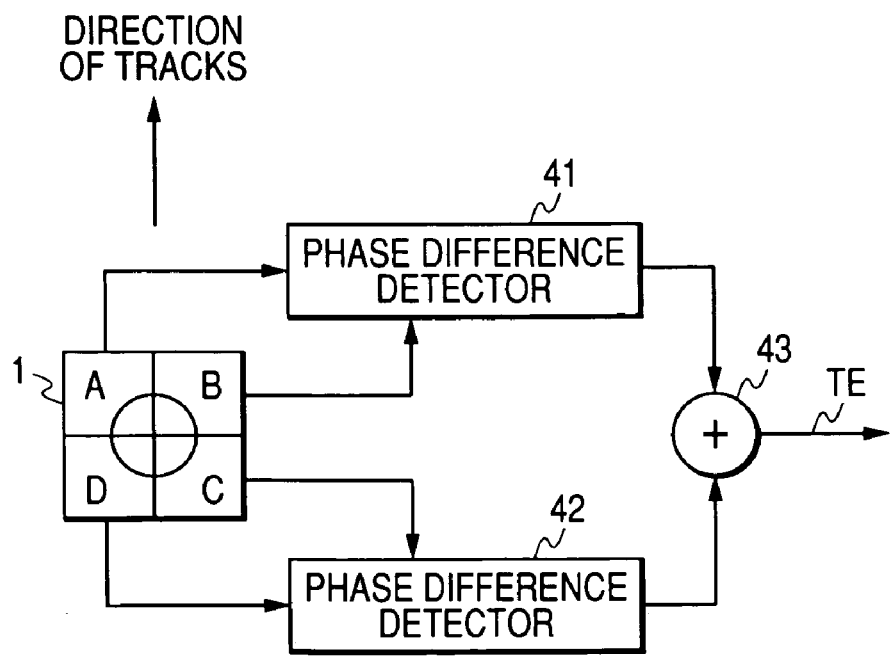
FIG. 3 is a block diagram showing the electric configuration of a tracking error signal generator (TE signal generator)

Based on the output of the light-receiving device 1, the TE signal generator 24 generates the tracking error signal TE by using a phase difference detection method. In this process, as shown in a schematic diagram in FIG. 3, a phase difference detector 41 obtains a phase difference between the outputs of the regions A and B that are arranged in a direction perpendicular to the track direction, and a phase difference detector 42 obtains a phase difference between the outputs of the regions D and C arranged in the direction perpendicular to the track direction. An adder 43 adds the output of the phase difference detector 41 to the output of the phase difference detector 42, and outputs the sum as the tracking error signal TE to a servo controller 6. Based on the output of the light-receiving device 1, the FE signal generator 25 generates the focus error signal FE, and outputs it to the servo controller 6.

The servo controller 6 drives the focus actuator 9 based on the focus error signal FE received from the RF signal processor 2, and performs servo control for the focus of the pickup 52. Further, the servo controller 6 drives the tracking actuator 10 based on the tracking error signal TE received from the RF signal processor 2, and performs tracking servo control to follow the pickup 52 along the track. When data are to be read from the pit data area 516 of the disk 51, the servo controller 6 performs servo control for the rotational speed of the spindle motor 7 based on a clock generated by the data modulator 4, so that a predetermined linear speed is obtained. Further, when data are to be read from the NBCA 513, the servo controller 6 performs servo control for the rotational speed of the spindle motor 7 based on the output of the FG signal generator 30, so that the rotational speed is appropriate (1440 rpm) for reading NBCA data (cutting data in claims).

The binarizer 3 compares, with a predesignated threshold value, the RF signal 201 received from the RF signal generator 21, binarizes the RF signal 201, and outputs the obtained binary RF signal to the data demodulator 4. Optimal threshold values used for binarization are respectively designated, by a jump controller 29, when data are to be read from the pit data area 516, and when data are to be read from the NBCA 513.

The data demodulator 4 demodulates digital data from a signal output by the binarizer 3, and performs error correction for the data. When the demodulated data for which error correction has been performed is data recorded in the pit data area 516, the data is output via a path 401 to a decoder (not shown). When the demodulated data for which error correction has been performed is data recorded in the NBCA 513, the data is output to a micro computer 5. For this process, the data demodulator 4 includes an NBCA data demodulator (cutting data demodulator) 26, a pit data demodulator 27 and a PLL unit 28.

When data output by the binarizer 3 is a signal designating data recorded in the NBCA 513, the NBCA data demodulator 26 performs a predetermined process for this signal, demodulates the data recorded in the NBCA 513, and performs error correction for the data. When a signal output by the binarizer 3 designates data recorded in the pit data area 516, the pit data demodulator 27 performs a predetermined process for this signal, demodulates digital data and performs error correction for the data. The PLL unit 28 generates a clock required for the demodulation of data recorded in the pit data area 516, and transmits the clock to the pit data demodulator 27 and the servo controller 6.

The micro computer 5 is a block for controlling the main operation of the DVD reproducing apparatus. The jump controller 29 is a block constituted by part of the functions of the micro computer 5, and controls the jumping of the pickup 52 across the tracks. That is, when the pickup 52 jumps across the tracks in the pit data area 516, a predetermined command is transmitted to the servo controller 6 to permit the pickup 52 to jump to a target track.

When data are to be read from the NBCA 513 of the disk 51, where the non-pit area 517 in which no pits are formed is located between the pit data area 516 and the NBCA 513, the jump controller 29 moves the pickup 52 to a position (indicated by a broken line 61) in the pit data area 516 in the vicinity of the border of the non-pit area 517. Thereafter, the sled motor 8 is driven by a predetermined driving method, and the pickup 52 is moved toward the inner circumference.

Then, the jump controller 29 determines whether the NBCA data demodulator 26 has demodulated the NBCA data (cutting data) When the NBCA data demodulator 26 can not demodulate the NBCA data, the jump controller 29 drives the sled motor 8 again using the predetermined driving method, and moves the pickup 52 toward the inner circumference. Following this, the jump controller 29 determines whether the NBCA data demodulator 26 has demodulated the NBCA data (cutting data). Thereafter, until the NBCA data demodulator 26 can demodulate the NBCA data, the jump controller 29 repetitively drives the sled motor 8 to move the pickup 52 toward the inner circumference.

At this time, in accordance with an increase in the number of times the sled motor 8 is driven, the jump controller 29 increases a product of a voltage to be applied to the sled motor 8 and the voltage application time, and internally stores the number of times that the sled motor 8 was driven. Further, when the jump controller 29 drives the sled motor 8 using a predetermined method to move the pickup 52 toward the inner circumference, the jump controller 29 fixes a gain and an offset used by the RF signal generator 21 to perform a signal process for the generation of the RF signal 201. Furthermore, the jump controller 29 sets a rotational speed of 1440 rpm for the disk 51, which corresponds to the reading of the NBCA data, and turns off the tracking servo control.

In addition, after the reading of the NBCA data has been completed, the jump controller 29 applies a voltage to the sled motor 8, during a period obtained by a predetermined method, at a polarity corresponding to the direction in which the pickup 52 moves from the NBCA 513 to the pit data area 516. As a result, the pickup 52 can be moved to the pit data area 516, skipping the non-pit area 517.

That is, when the jump controller 29 drives the sled motor 8 to move the pickup 52 from the NBCA 513 to the pit data area 516, the jump controller 29 designates, as a stored value corresponding to the number of times the sled motor 8 was driven, the product of the voltage applied to the sled motor 8 and the application time, which will be described later.

Figure 7:
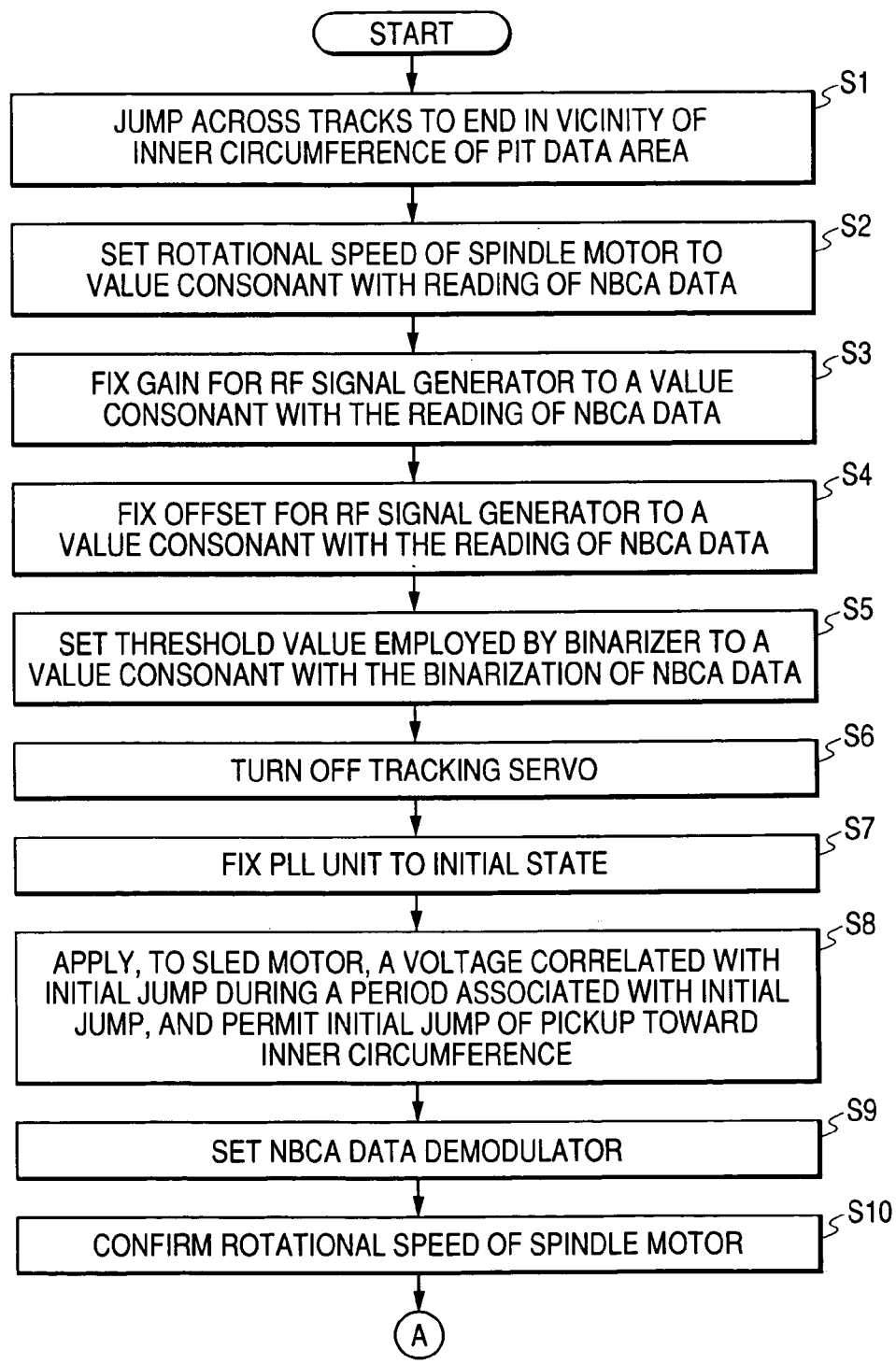
FIG. 7 is a flowchart showing the setup operation for reading NBCA data.
Figure 8:
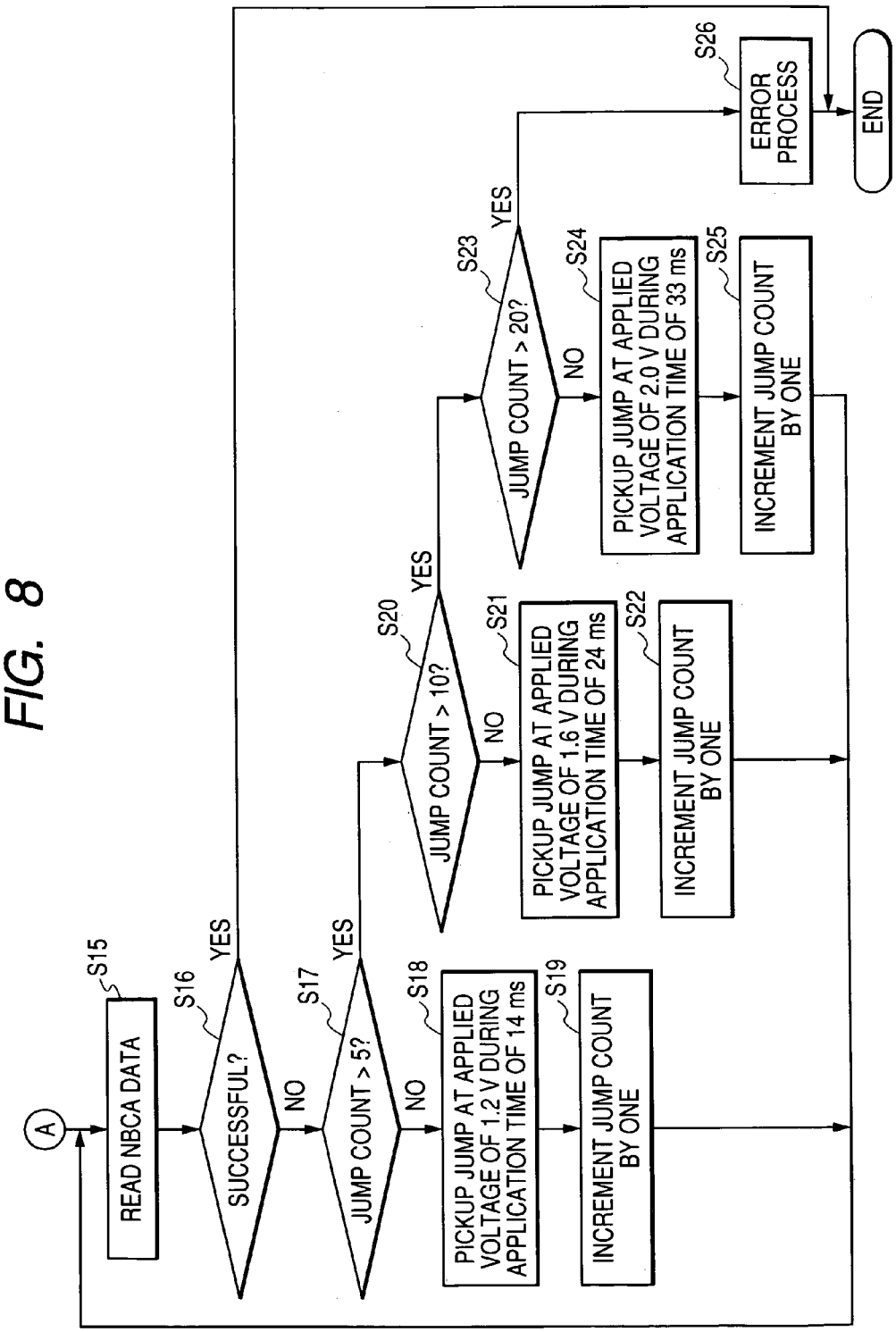
FIG. 8 is a flowchart showing the operation for moving a pickup to an NBCA.
Figure 9:
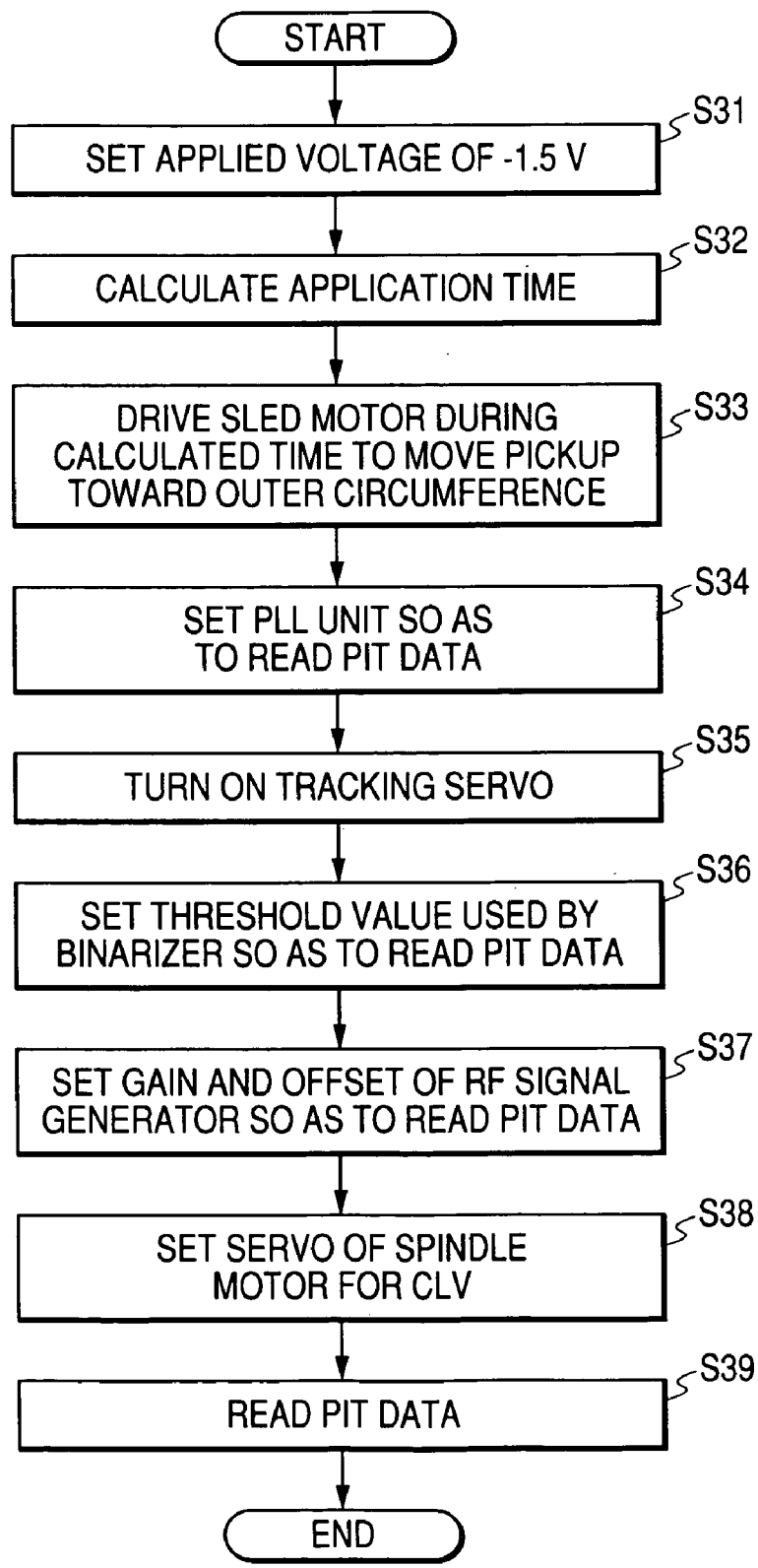
FIG. 9 is a flowchart showing the operation for moving the pickup from an NBCA to a pit data area.

FIG. 7 is a flowchart showing the setup operation for reading NBCA data, FIG. 8 is a flowchart showing the operation for moving the pickup to the NBCA, and FIG. 9 is a flowchart showing the operation for moving the pickup from the NBCA to the pit data area. The operations for the embodiment will now be described while referring to these flowcharts, as needed.

When the disk 51 is placed on a tray and is then retracted to a reading position, and when the reading of data from the pit data area 516 is ready, the micro computer 5 reads Book Type from Physical format information recorded in the control data area 514. When the bits 7 to 4 of Book Type are "0010", the micro computer 5 determines that the disk 51 is a DVD-R, and when the bits 7 to 4 are "0011", the micro computer 5 determines that the disk 51 is a DVD-RW. The micro computer 5 also reads the NBCA Descriptor from the Physical Format Information, and determines that there is an NBCA 513 on the disk 51 when bit 7 of NBCA Descriptor is a "1".

Assume that, when as is described above, the disk 51 is a DVD-R or a DVD-RW and the NBCA 513 is present, an instruction for reading NBCA data is issued by a back end. Upon receiving this instruction, the jump controller 29 permits the pickup 52 to jump across the tracks to a position (indicted by the broken line 61 at address "02F300h") in the vicinity of the inner circumference edge of the pit data area 516 (step S1). Thereafter, the jump controller 29 designates 1440 rpm, which is the rotational sped of the spindle motor 7, in consonance with the reading of NBCA data (step S2).

Following this, the jump controller 29 fixes the gain and the offset of the RF signal generator 21 to values (values corresponding to BDO (Black Dot Out) signals) that are consonant with the reading of NBCA data (steps S3 and S4). Therefore, when the pickup 52 does not perform the reading of pit data, and when NBCA data is present at the reading position, the level change representing the NBCA data appears in the RF signal 201. Further, the jump controller 29 designates as a threshold value employed by the binarizer 3 a value consonant with the binarization of the NBCA data (step S5). Thus, when the level change representing the NBCA data appears in the RF signal 201, the NBCA data can be correctly binarized.

Next, the jump controller 29 sets the tracking servo control to the OFF state (step S6). Therefore, when generation of the tracking error TE is disabled, the reading position of the pickup 52 can be prevented from being destablized. Furthermore, the jump controller 29 fixes a frequency oscillated by the PLL unit 28 to a frequency in the initial state (step S7). As a result, when the reading position is located in the non-pit area 517, the unstable fluctuation of the oscillation frequency of the PLL unit 28 can be prevented.

Thereafter, the jump controller 29, during a period associated with the first jump, applies a voltage correlated with the first jump to the sled motor 8 and moves the pickup 52 toward the inner circumference. Then, the jump controller 29 sets "1" as the value of a counter (not shown) for counting the number of jumps (step S8). Following this, the jump controller 29 sets the NBCA data demodulator 26 to a state appropriate for the reading of the NBCA data (step S9). Further, the jump controller 29 examines the rotational speed of the spindle motor 7 to determine whether it is being maintained at the predetermined rotational speed of 1440 rpm (step S10).

Sequentially, the jump controller 29 transmits a reading instruction to the NBCA data demodulator 26, and permits the NBCA data demodulator 26 to read the NBCA data (step S15). Then, the jump controller 29 determines whether the NBCA data demodulator 26 could read the NBCA data (step S16). When the NBCA data demodulator 26 can not read the NBCA data, the jump controller 29 assumes that the pickup 52 has not yet moved to the NBCA 513, and that the reading position of the pickup 52 is located in the non-pit area 517.

Thereafter, the jump controller 29 examines the number of jumps to determine whether it is greater than five. At this time, since the number of jumps is one, the jump controller 29 drives the sled motor 8 at an applied voltage of 1.2 V during an application time of 14 ms (steps S17 and S18). Then, the jump controller 29 increments, by one, the value of the counter for counting the number of jumps (step S19). Next, the jump controller 29 shifts to step S15, and permits the NBCA data demodulator 26 to read the NBCA data. Thereafter, the loop operation at steps S15 to S19 is repeated either until the reading of NBCA data by the NBCA data demodulator 26 is successful, or until the value of the counter for counting the number of jumps reaches six.

When the movement of the mechanism that employs the sled motor 8 to move the pickup 52 is smooth throughout the loop operation, the pickup 52 is moved to the NBCA 513. Assuming that four jumps are required to move the reading position of the pickup 52 to the NBCA 513, this change 62 in the reading position of the pickup 52 is shown in FIG. 6 (a jump 621 at step S18 is also shown).

Assume that, since the mechanism for moving the pickup 52 in the radial direction by using the sled motor 8 does not move smoothly, the loop operation is repeated until the number of jumps reaches six and the pickup 52 is finally moved to the NBCA 513. In this case, program control is shifted from step S17 to step S20 to examine the number of jumps to determine whether it exceeds ten. Since the number of jumps is six, program control advances from steps S20 to step S21.

At step S21, the jump controller 29 drives the sled motor 8 at an applied voltage of 1.6 V and during an application time of 24 ms. The jump controller 29 also increments, by one, the value of the counter for counting the number of jumps (step S22). Then, the jump controller 29 moves to step S15 and permits the NBCA data demodulator 26 to read the NBCA data. Thereafter, the loop operation at steps S15 to S17 and S20 to S22 is repeated either until the reading of the NBCA data by the NBCA data demodulator 26 is successful, or until the value of the counter for counting the number of jumps reaches eleven. When seven jumps are required to move the reading position of the pickup 52 to the NBCA 513, this change 63 in the reading position of the pickup 52 is shown in FIG. 6 (a jump 631 at step S18 and a jump 642 at step S21 are also shown).

However, assume that, since much friction is generated by the movement of the mechanism for moving the pickup 52 in the radial direction using the sled motor 8, the loop operation is repeated until the number of jumps reaches eleven, and still the pickup 52 has not been moved to the NBCA 513. At this time, program control is shifted from step S20 to step S23 to determine whether the number of jumps exceeds twenty. Since the number of jumps is eleven, program control advances from step S23 to step S24.

At step S24, the jump controller 29 drives the sled motor 8 at an applied voltage of 2.0 V during an application time of 33 ms. Then, the jump controller 29 increments, by one, the value of the counter for counting the number of jumps (step S25). The jump controller 29 then shifts to step S15 and permits the NBCA data demodulator 26 to read the NBCA data. Thereafter, the loop operation at steps S15 to S17, S20 and S23 to S25 is repeated either until the reading of NBCA data by the NBCA data demodulator 26 is successful, or until the value of the counter for counting the number of jumps reaches 21. Assuming that moving the reading position of the pickup 52 to the NBCA 513 requires twelve jumps, this change 64 in the reading position of the pickup 52 is shown in FIG. 6 (a jump 641 at step S18, a jump 642 at step S21 and a jump 643 at step S24 are also shown).

When the loop operation at steps S15 to S17, S20 and S23 to S25 is repeated until the value of the counter for counting the number of jumps reaches 21, and when the NBCA data demodulator 26 fails to read the NBCA data, the jump controller 29 assumes a defect has occurred, and performs an error process (step S26) The operation for moving the pickup 52 to the NBCA 513 has been described. An explanation will now be given for the operation for moving the pickup 52 from the NBCA 513 to the pit data area 516.

When the reading of the NBCA data recorded in the NBCA 513 has been completed, the jump controller 29 returns the pickup 52 to the pit data area 516. For this process, the jump controller 29 sets a voltage of −1.5 V to be applied to the sled motor 8 (step S31). Further, based on the number of times that the sled motor 8 was driven to move the pickup 52 from the initial position to the NBCA 513, the jump controller 29 employs a method shown in FIG. 10 to calculate a period for applying the voltage to the sled motor 8 (step S32). When the jump controller 29 drives the sled motor 8 during the time period that is thus obtained, the pickup 52 is moved from the NBCA 513 toward the outer circumference, and is halted at a position in the vicinity of the initial position 61 in the pit data area 516 (step S33).

This movement 65 of the pickup 52 is shown in FIG. 6, and a halt position 66 is located in the vicinity and outside the initial position 61. That is, when the reproduction of the contents in the common data area 511 is initiated, the pickup 52 is located near the position from which the move is required. Therefore, the pickup 52 need only be moved a short distance to shift the operation to the reproduction of the contents, so that the period required before the reproduction can be started can be reduced.

When the pickup 52 is moved to the position 66 in the pit data area 516, the reading of pit data is enabled, and also the tracking error signal TE can be generated. Therefore, the jump controller 29 returns the setup of the PLL unit 28 to a setup appropriate for the reading of pit data (step S34), and also turns on the tracking servo (step S35). Further, the jump controller 29 sets a threshold value used by the binarizer 3 to a value consonant with the reading of pit data (step S36), and sets the gain and the offset for the RF signal generator 21 to values consonant with the reading of pit data (step S37). Then, the jump controller 29 changes the servo control of the spindle motor 7 to CLV control from the predetermined rotation speed control based on the output of the FG signal generator 30 (step S38). Following this, the jump controller 29 performs the operation for starting the reading of pit data, examines an address for data that has been read, and confirms that the pickup 52 has been returned to the pit data area 516 (step S39).

When the NBCA data indicates that the contents are the first copy, the micro computer 5 sets a flag indicating that reproduction is permitted. When the NBCA data indicates the contents are the second or a following copy, the micro computer 5 sets a flag indicating that reproduction is inhibited.

When a servo control error, such the loss of focus, occurs while the NBCA data demodulator 26 is demodulating the NBCA data, all the setups, such as the gain and the offset of the RF signal generator 21, the setup of the PLL unit 28, the threshold value used by the binarizer 3 and the servo control by the spindle motor 7, are changed to those appropriate for reading data in the pit data area 516. Thereafter, the sled motor 8 is driven to move the pickup 52 to the pit data area 516, and the operation is restarted beginning at step S1.

As is described above, when the sled motor 8 is driven to move the pickup 52 from the position (initial position before a jump) indicated by the broken line 61 to the NBCA 513, the product of the applied voltage and the application time for driving the sled motor 8 is increased as the number of jumps is increased. As a result, the following effects are obtained.

When the product of the voltage and the application time for driving the sled motor 8 is small, the sled motor 8 must be driven many times to move the pickup 52 to the NBCA 513, and accordingly, the period required for moving the pickup 52 from the initial position 61 to the NBCA 513 is extended. This problem is more outstanding when the pickup 52 is moved only a short distance each time the sled motor 8 is driven, because a large amount of friction is generated by the mechanism for moving the pickup 52 in the radial direction. When the product of the voltage and the application time for driving the sled motor 8 is a large value, the distance traveled by the pickup 52 each time the sled motor 8 is driven is increased. Therefore, when the pickup 52 moved by driving the sled motor 8 the N-th time is halted at a location in the vicinity of the NBCA 513, the possibility is increased that the pickup 52 may pass across the NBCA 513 by driving the sled motor 8 the (N+1)th time. This problem is more outstanding since the pickup 52 is moved a great distance by driving the sled motor 8 one time because the movement of the mechanism for moving the pickup 52 in the radial direction is smooth.

However, according to the embodiment, to move the pickup 52 from the initial position 61 to the NBCA 513, the product of the applied voltage and the application time for driving the sled motor 8 is increased as the number of jumps (the number of times that the sled motor 8 is driven) is increased. Therefore, it is possible to prevent the occurrence of a phenomenon such that the reading position of the pickup 52 is not halted in the NBCA 513 and passes across the NBCA 513, and to prevent the extension of the period required to move the pickup 52 to the NBCA 513.

The present invention is not limited to this embodiment, and while a DVD-RW has been employed as a disk, the present invention can also be applied for a DVD-R.

As is described above, according to the present invention, to read data recorded in an NBCA of a disk where a non-pit area in which pits are not formed is located between a pit data area and the NBCA, the jump controller moves the pickup to an initial position in the pit data area in the vicinity of a border of the non-pit area, and repeats a process for driving the sled motor using a predetermined drive method and moving the pickup toward the NBCA until the NBCA data demodulator demodulates NBCA data. Then, to permit the sled motor to move the pickup from the initial position toward the NBCA, the jump controller fixes a gain and an offset employed by the RF signal generator to generate the RF signal, designates a rotational speed for the disk for reading data in the NBCA, and turns off a tracking servo. Following this, to repeat the process for permitting the sled motor to move the pickup toward the NBCA, the jump controller increases, in accordance with an increase in the number of times the sled motor is driven, a product of a voltage to be applied to the sled motor and an application time for the voltage. Thereafter, to move the pickup located in the NBCA to the pit data area, the jump controller applies a predetermined voltage to the sled motor and designates as an application time for the predetermined voltage a value that corresponds to the number of times that the sled motor was driven to move the pickup from the initial position to the NBCA, so that by driving the sled motor only once, the pickup is moved from the NBCA to the pit data area. Therefore, a direct current motor that is not subject to closed loop control is employed as a sled motor, when a tracking error signal is generated by a phase difference detection method, NBCA data can be read from a DVD-RW that has not been finalized, when because of a variance in the friction of a mechanism for employing a sled motor to move a pickup, the distance traveled by the pickup differs even when a constant voltage is applied to the sled motor at a constant application time, it is possible to prevent both the occurrence of a phenomenon such that a pickup skips an NBCA and the extension of a period before the pickup is moved to the NBCA, the moving of the pickup in an area where pits are not formed can be stabilized, and it is possible to simplify the calculation of the voltage application time, during which a voltage is applied to the sled motor to return the pickup, located in the NBCA, to the range in the vicinity of the inner circumference of an area wherein pits are formed.

Further, according to the invention, to read data recorded in a cutting data area of a disk where a non-pit area in which pits are not formed is located between a pit data area and the cutting data area, the jump controller moves the pickup to an initial position in the pit data area in the vicinity of a border of the non-pit area, and repeats a process for driving the sled motor using a predetermined drive method and moving the pickup toward the cutting data area, until the cutting data demodulator demodulates cutting data. Therefore, a direct current motor that is not subject to closed loop control is employed as a sled motor, and NBCA data can be read from a non-finalized DVD-RW even when a tracking error signal is generated by a phase difference detection method.

Furthermore, to repeat the process for permitting the sled motor to move the pickup toward the cutting data area, the jump controller increases, in accordance with an increase in the number of times the sled motor is driven, a product of a voltage to be applied to the sled motor and an application time for the voltage. Therefore, when because of a variance in movement smoothness for a mechanism that employs a sled motor to move a pickup, the distance traveled by the pickup differs even when a constant voltage is applied to the sled motor at a constant application time, it is possible to prevent both the occurrence of a phenomenon such that the pickup skips the NBCA and the extension of a period before the pickup is moved to the NBCA.

Moreover, to permit the sled motor to move the pickup from the initial position toward the cutting data area, the jump controller fixes a gain and an offset employed by the RF signal generator to generate the RF signal, designates a rotational speed for the disk for reading data in the cutting data area, and turns off a tracking servo. Therefore, the control for the movement of a pickup in an area wherein pits are not formed can be stabilized.

In addition, to move the pickup located in the cutting data area to the pit data area, the jump controller drives the sled motor only once to move the pickup from the cutting data area to the pit data area. Therefore, a pickup located in an NBCA can be returned to an area where pits are formed.

Further, to move the pickup located in the cutting data area to the pit data area, the jump controller designates as a product of a voltage to be applied to the sled motor and an application time a value that corresponds to the number of times that the sled motor was driven to move the pickup from the initial position to the cutting data area, so that by driving the sled motor only once, the pickup is moved from the cutting data area to the pit data area. Therefore, a pickup located in an NBCA can be returned to a range in the vicinity of the inner circumference of an area wherein pits are formed.

Furthermore, to move the pickup located in the cutting data area to the pit data area, the jump controller applies a predetermined voltage to the sled motor and designates as an application time for the predetermined voltage a value that corresponds to the number of times that the sled motor was driven to move the pickup from the initial position to the cutting data area, so that by driving the sled motor only once, the pickup is moved from the cutting data area to the pit data area. Therefore, it is possible to simplify the calculation of a voltage application time for applying a voltage to a sled motor in order to return a pickup located in an NBCA to a range in the vicinity of the inner circumference of an area wherein pits are formed.

What is claimed is:

1. A DVD reproducing apparatus comprising:
   a pickup to read data from a disk, which includes a pit data area to form pits depicting data along tracks, and an NBCA to read data by laser cutting in a radial direction;
   an RF signal processor, which includes a tracking error signal generator to generate a tracking error signal using a phase difference detection method, and an RF signal generator to perform a predetermined process for a signal output from the pickup to generate an RF signal;
   an NBCA data demodulator to employ the RF signal to demodulate data recorded in the NBCA;
   a jump controller to permit the pickup to jump over the tracks based on the tracking error signal; and
   a sled motor to move the pickup in the radial direction,
   wherein a direct current motor, a revolution of which is not subject to closed loop control, is employed as a sled motor,
   wherein to read data recorded in an NBCA of a disk having a non-pit area which does not form pits and is located between a pit data area and the NBCA, the jump controller moves the pickup to an initial position which is in the pit data area and is in a vicinity of a border between the non-pit area and the pit data area, and repeats a control for driving the sled motor to move the pickup toward the NBCA using a predetermined drive method until the NBCA data demodulator demodulates NBCA data,
   wherein to drive the sled motor to move the pickup from the initial position toward the NBCA, the jump controller fixes a gain and an offset employed by the RF signal generator to generate the RF signal, sets a rotational speed for the disk to a value corresponding to reading data in the NBCA, and turns off a tracking servo,
   wherein to repeat the control for driving the sled motor to move the pickup toward the NBCA, the jump controller increases a product of a voltage to be applied to the sled motor and a time length to apply the voltage, in accordance with an increase in a number of times the sled motor is driven, and
   wherein to move the pickup located in the NBCA to the pit data area, the jump controller applies a predetermined voltage to the sled motor, sets a time length to apply the predetermined voltage to a value corresponding to a number of times that the sled motor is driven to move the pickup from the initial position to the NBCA, and moves the pickup from the NBCA to the pit data area by single driving of the sled motor.

2. A disk reproducing apparatus comprising:
a pickup to read data from a disk, which includes a pit data area to form pits depicting data are formed along tracks, and a cutting data area to record data by laser cutting in a radial direction;
an RF signal processor, which includes a tracking error signal generator to generate a tracking error signal using a phase difference detection method, and an RF signal generator to perform a predetermined process for a signal output from the pickup to generate an RF signal;
a cutting data demodulator to employ the RF signal to demodulate data recorded in the cutting data area;
a jump controller to permit the pickup to jump over the tracks based on the tracking error signal; and
a sled motor to move the pickup in the radial direction,
wherein a direct current motor, a revolution of which is not subject to closed loop control, is employed as a sled motor,
wherein to read data recorded in a cutting data area of a disk having a non-pit area which does not form pits and is located between a pit data area and the cutting data area, the jump controller moves the pickup to an initial position which is in the pit data area and is in the vicinity of a border between the non-pit area and the pit data area, and repeats a control for driving the sled motor to move the pickup toward the cutting data area using a predetermined drive method until the cutting data demodulator demodulates cutting data.

3. The disk reproducing apparatus according to claim 2, wherein to repeat the control for driving the sled motor to move the pickup toward the cutting data area, the jump controller increases a product of a voltage to be applied to the sled motor and a length to apply the voltage, in accordance with an increase in a number of times the sled motor is driven.

4. The disk reproducing apparatus according to claim 2, wherein to drive the sled motor to move the pickup from the initial position toward the cutting data area, the jump controller fixes a gain and an offset employed by the RF signal generator to generate the RF signal, sets a rotational speed for the disk to a value corresponding to reading data in the cutting data area, and turns off a tracking servo.

5. The disk reproducing apparatus according to claim 3, wherein to drive the sled motor to move the pickup from the initial position toward the cutting data area, the jump controller fixes a gain and an offset employed by the RF signal generator to generate the RF signal, sets a rotational speed for the disk to a value corresponding to reading data in the cutting data area, and turns off a tracking servo.

6. The disk reproducing apparatus according claim 2, wherein to move the pickup located in the cutting data area to the pit data area, the jump controller moves the pickup from the cutting data area to the pit data area by single driving of the sled motor.

7. The disk reproducing apparatus according claim 3, wherein to move the pickup located in the cutting data area to the pit data area, the jump controller moves the pickup from the cutting data area to the pit data area by single driving of the sled motor.

8. The disk reproducing apparatus according claim 4, wherein to move the pickup located in the cutting data area to the pit data area, the jump controller moves the pickup from the cutting data area to the pit data area by single driving of the sled motor.

9. The disk reproducing apparatus according claim 5, wherein to move the pickup located in the cutting data area to the pit data area, the jump controller moves the pickup from the cutting data area to the pit data area by single driving of the sled motor.

10. The disk reproducing apparatus according to claim 2, wherein to move the pickup located in the cutting data area to the pit data area, the jump controller sets a product of a voltage to be applied to the sled motor and a time length to apply the voltage to a value corresponding to a number of times that the sled motor is driven to move the pickup from the initial position to the cutting data area, and moves the pickup from the cutting data area to the pit data area by single driving of the sled motor.

11. The disk reproducing apparatus according to claim 3, wherein to move the pickup located in the cutting data area to the pit data area, the jump controller sets a product of a voltage to be applied to the sled motor and a time length to apply the voltage to a value corresponding to a number of times that the sled motor is driven to move the pickup from the initial position to the cutting data area, and moves the pickup from the cutting data area to the pit data area by single driving of the sled motor.

12. The disk reproducing apparatus according to claim 4, wherein to move the pickup located in the cutting data area to the pit data area, the jump controller sets a product of a voltage to be applied to the sled motor and a time length to apply the voltage to a value corresponding to a number of times that the sled motor is driven to move the pickup from the initial position to the cutting data area, and moves the pickup from the cutting data area to the pit data area by single driving of the sled motor.

13. The disk reproducing apparatus according to claim 5, wherein to move the pickup located in the cutting data area to the pit data area, the jump controller sets a product of a voltage to be applied to the sled motor and a time length to apply the voltage to a value corresponding to a number of times that the sled motor is driven to move the pickup from the initial position to the cutting data area, and moves the pickup from the cutting data area to the pit data area by single driving of the sled motor.

14. The disk reproducing apparatus according to claim 2, wherein to move the pickup located in the cutting data area to the pit data area, the jump controller applies a predetermined voltage to the sled motor, sets a time length to apply the predetermined voltage to a value that corresponds to a number of times that the sled motor is driven to move the pickup from the initial position to the cutting data area, and moves the pickup from the cutting data area to the pit data area by single driving of the sled motor.

15. The disk reproducing apparatus according to claim 3, wherein to move the pickup located in the cutting data area to the pit data area, the jump controller applies a predetermined voltage to the sled motor, sets a time length to apply the predetermined voltage to a value that corresponds to a number of times that the sled motor is driven to move the pickup from the initial position to the cutting data area, and moves the pickup from the cutting data area to the pit data area by single driving of the sled motor.

16. The disk reproducing apparatus according claim 4, wherein to move the pickup located in the cutting data area to the pit data area, the jump controller applies a predetermined voltage to the sled motor, sets a time length to apply the predetermined voltage to a value that corresponds to a number of times that the sled motor is driven to move the pickup from the initial position to the cutting data area, and moves the pickup from the cutting data area to the pit data area by single driving of the sled motor.

17. The disk reproducing apparatus according claim 5, wherein to move the pickup located in the cutting data area to the pit data area, the jump controller applies a predetermined voltage to the sled motor, sets a time length to apply the predetermined voltage to a value that corresponds to a number of times that the sled motor is driven to move the pickup from the initial position to the cutting data area, and moves the pickup from the cutting data area to the pit data area by single driving of the sled motor.

18. A DVD reproducing method comprising:

reading data using a pickup from a disk, which includes a pit data area to form pits depicting data along tracks, and an NBCA to read data by laser cutting in a radial direction;

generating a tracking error signal using a phase difference detection method;

performing a predetermined process for a signal output from the pickup to generate an RF signal;

employing the RF signal to demodulate data recorded in the NBCA;

permitting the pickup to jump over the tracks based on the tracking error signal;

employing a direct current motor, a revolution of which is not subject to closed loop control, as a sled motor to move the pickup in the radial direction;

to read data recorded in an NBCA of a disk having a non-pit area which does not form pits and is located between a pit data area and the NBCA, moving the pickup to an initial position which is in the pit data area and is in a vicinity of a border between the non-pit area and the pit data area, and repeating a control for driving the sled motor to move the pickup toward the NBCA using a predetermined drive method until the NBCA data demodulator demodulates NBCA data;

to drive the sled motor to move the pickup from the initial position toward the NBCA, fixing a gain and an offset employed by the RF signal generator to generate the RF signal, setting a rotational speed for the disk to a value corresponding to reading data in the NBCA, and turning off a tracking servo;

to repeat the control for driving the sled motor to move the pickup toward the NBCA, increasing a product of a voltage to be applied to the sled motor and a time length to apply the voltage, in accordance with an increase in a number of times the sled motor is driven; and to move the pickup located in the NBCA to the pit data area, applying a predetermined voltage to the sled motor, setting a time length to apply the predetermined voltage to a value corresponding to a number of times that the sled motor is driven to move the pickup from the initial position to the NBCA, and moving the pickup from the NBCA to the pit data area by single driving of the sled motor.

* * * * *